(12) United States Patent
Rousu et al.

(10) Patent No.: US 9,154,171 B2
(45) Date of Patent: Oct. 6, 2015

(54) RECONFIGURABLE RADIO FREQUENCY CIRCUITS AND METHODS OF RECEIVING

(71) Applicant: Broadcom Corporation, Irvine, CA (US)

(72) Inventors: Seppo Rousu, Oulu (FI); Juha Valtanen, Oulu (FI)

(73) Assignee: BROADCOM CORPORATION, Irvine, CA (US)

( * ) Notice: Subject to any disclaimer, the term of this patent is extended or adjusted under 35 U.S.C. 154(b) by 403 days.

(21) Appl. No.: 13/782,679

(22) Filed: Mar. 1, 2013

(65) Prior Publication Data

US 2013/0244722 A1 Sep. 19, 2013

(30) Foreign Application Priority Data

Mar. 16, 2012 (GB) .................................. 1204692.6

(51) Int. Cl.
*H04M 1/00* (2006.01)
*H04B 1/16* (2006.01)
*H04B 1/00* (2006.01)

(52) U.S. Cl.
CPC ................ *H04B 1/16* (2013.01); *H04B 1/0057* (2013.01)

(58) Field of Classification Search
CPC ................................ H04B 1/16; H04B 1/0057
See application file for complete search history.

(56) References Cited

U.S. PATENT DOCUMENTS

| | | | | |
|---|---|---|---|---|
| 4,092,602 A | * | 5/1978 | Nishioka et al. ................... | 381/3 |
| 5,915,223 A | * | 6/1999 | Lecuyer et al. ............ | 455/552.1 |
| 7,010,286 B2 | * | 3/2006 | Sorrells et al. ................ | 455/313 |
| 7,187,913 B1 | * | 3/2007 | Rahn et al. .................. | 455/188.1 |
| 2003/0193923 A1 | * | 10/2003 | Abdelgany et al. ........... | 370/342 |
| 2004/0063414 A1 | * | 4/2004 | Kasperkovitz ................ | 455/260 |
| 2005/0124377 A1 | * | 6/2005 | Shih et al. .................. | 455/552.1 |
| 2006/0252403 A1 | * | 11/2006 | Garcia .......................... | 455/334 |
| 2007/0213015 A1 | * | 9/2007 | Nagano et al. .................. | 455/83 |
| 2011/0230157 A1 | * | 9/2011 | Zhou et al. .................... | 455/326 |
| 2012/0202561 A1 | * | 8/2012 | Robinett .................... | 455/552.1 |

FOREIGN PATENT DOCUMENTS

WO WO 92/21195 A1 11/1992
WO WO 00/19629 A1 4/2000

OTHER PUBLICATIONS

UKIPO Combined Search and Examination Report under Section 17 and 18(3) dated Jul. 20, 2012 which is issued in a related British Application No, GB1204692.6 (7 page).

* cited by examiner

*Primary Examiner* — Keith Fang
(74) *Attorney, Agent, or Firm* — Foley & Lardner LLP

(57) ABSTRACT

A reconfigurable radio frequency circuit is arranged for receiving at least one carrier in a wireless communications terminal arranged to receive at least two carriers, each of the two carriers being transmitted in a different one of a plurality of operating frequency bands, and each of the plurality of operating frequency bands occupying a part of a first or a second frequency range. The circuit includes a combiner for connecting the output of a first receiver filter at a first operating frequency band within the first frequency range to the input of an amplifier and for connecting the output of a second receiver filter at a second operating frequency band within the second frequency range to the input of the amplifier. The amplifier has a selectable operating frequency range, the operating frequency range being selectable at least between the first frequency range and the second frequency range.

20 Claims, 14 Drawing Sheets

RECONFIGURABLE RADIO FREQUENCY CIRCUITS AND METHODS OF RECEIVING

This application claims the benefit under 35 U.S.C. §119 (a) and 37 CFR §1.55 to UK Patent Application No. 1204692.6, filed on Mar. 16, 2012, the entire content of which is incorporated herein by reference.

TECHNICAL FIELD

The present invention relates to reconfigurable radio frequency circuits, methods of receiving and receivers for radio communication systems, and in particular, but not exclusively, to carrier aggregation schemes.

BACKGROUND

Long Term Evolution (LTE) Advanced is a mobile telecommunication standard proposed by the $3^{rd}$ Generation Partnership Project (3GPP) and first standardised in 3GPP Release 10. In order to provide the peak bandwidth requirements of a $4^{th}$ Generation system as defined by the International Telecommunication Union Radiocommunication (ITU-R) Sector, while maintaining compatibility with legacy mobile communication equipment, LTE Advanced proposes the aggregation of multiple carrier signals in order to provide a higher aggregate bandwidth than would be available if transmitting via a single carrier signal. This technique of Carrier Aggregation (CA) requires each utilised carrier signal, that is to say radio frequency signal, to be demodulated in a receiver at a wireless communications terminal, whereafter the message data from each of the signals can be combined in order to reconstruct the original data. Carrier Aggregation can be used also in other radio communication protocols such as High Speed Packet Access (HSPA).

Carrier Aggregation may involve aggregation of radio frequency signals, that is to say carriers that are transmitted in the same operating frequency band, or aggregation of radio frequency signals that are transmitted in different operating frequency bands. An operating frequency band may be a range of radio frequencies allocated to an operator as a contiguous block, or part of a contiguous block, and typically a radio receiver for receiving a radio frequency signal will have a receiver filter, such as a front end band pass filter, arranged to encompass the operating frequency band, but reject signals transmitted in other bands. The receiver filter serves to protect the receiver from saturation, blocking and interference by out of band signals, which may be at a high power level and beyond the operator's control.

If data is transmitted using carrier aggregation of radio frequency signals that are transmitted in the same frequency band, typically a single receiver filter may be used to receive the carrier aggregated signals, and a receiver chain for each of the radio frequency signals may be arranged to receive signals that have passed through the receiver filter. However, if data is transmitted using carrier aggregation of radio frequency signals that are transmitted in different frequency bands, more than one receiver filter is typically required to receive the carrier aggregated signals, and each receiver chain typically needs to be arranged to receive signals that have passed through the appropriate receiver filter.

A wireless communications terminal may be required to be reconfigurable between a configuration for receiving data that is transmitted using carrier aggregation of radio frequency signals in the same operating frequency band, and a configuration for receiving data that is transmitted using carrier aggregation of radio frequency signals in different operating frequency bands. A reconfigurable radio frequency circuit is required for use in such a wireless communications terminal, to allow appropriately filtered signal paths having required radio frequency performance to be configured between one or more antennas and receive chains used to receive respective radio frequency signals, which may have been transmitted in the same or different operating frequency bands.

Furthermore, a wireless communications terminal may be required to be configured to receive signals from different base stations in different operating frequency bands simultaneously for use in handover, and may also be required to receive services other than cellular radio, for example satellite navigation and or signals of an alternate radio access technology in further operating bands. The terminal may also be required to be configured for use in multi-SIM (Subscriber Information Module) operation, in which data or paging signals may be received using several carriers, each carrier typically relating to a SIM or USIM (Universal Subscriber Information Module), the carriers being in either the same or different operating frequency bands.

Conventionally, a receiver may be arranged to receive signals in a selected one or more of several operating frequency bands by the provision of a variety of receiver filters, one or more of which may be selected according to the operating frequency band in which signals are to be received. Conventionally, each receiver filter is connected to a respective amplifier such as a Low Noise Amplifier (LNA) which is designed to operate in the pass band of the receiver filter. As a result, in a system with a large number of selectable receiver filters, there may also be a large number of amplifiers provisioned, not all of which may be required to operate simultaneously for the reception of an expected set of signals. The provision of such amplifiers may lead to an increase in the number of circuit elements and complexity of a radio frequency circuit, and to increased demands for area in a radio frequency integrated circuit (RFIC) implementation.

It is an object of the invention to address at least some of the limitations of the prior art systems.

SUMMARY

In accordance with a first aspect of the present invention, there is provided a reconfigurable radio frequency circuit for receiving at least one carrier in a wireless communications terminal, the wireless communications terminal being arranged to receive at least two carriers, each of the two carriers being transmitted in a different one of a plurality of operating frequency bands, each of the plurality of operating frequency bands occupying a part of a first or a second frequency range, the second frequency range being different from the first frequency range, the circuit including:

a plurality of receiver filters, including at least a first receiver filter arranged to pass carrier frequencies within a first operating frequency band within the first frequency range, a second receiver filter arranged pass second carrier frequencies within a second operating frequency band within the second frequency range, a third receiver filter arranged to pass carrier frequencies within a third operating frequency band, and a fourth receiver filter arranged to pass carrier frequencies within a fourth operating frequency band;

a first combiner for connecting the output of the first receiver filter at the first operating frequency band to a signal path leading to the input of a first amplifier and for connecting the output of the second receiver filter at the second operating frequency band to a signal path leading to the input of the first amplifier; and a second combiner for connecting the output of the third receiver filter at the third operating frequency band to a signal path leading to the input of a second amplifier and for connecting the output of the fourth receiver filter at the fourth operating frequency band to a signal path leading to the input of the second amplifier, wherein the first amplifier has an operating frequency range that is selectable at least between the first frequency range and the second frequency range, and the second amplifier has an operating frequency range that is selectable at least between the first frequency range and the second frequency range, wherein at least two of said first, second, third and fourth receiver filters are arranged to pass frequency operating bands that may be used together and are arranged to be connected to a different one of said first and second amplifiers.

An advantage of the amplifier having a selectable operating frequency range, the operating frequency range being selectable at least between the first frequency range and the second frequency range, is that fewer amplifiers are required to implement a reconfigurable receiver compared with a case in which an amplifier has a fixed operating range at either the first frequency range or the second frequency range. This is particularly advantageous in terms of reducing circuitry and therefore surface area of a Radio Frequency Integrated Circuit (RFIC). Typically the cost of a RFIC is related to its surface area.

Arranging filters that are arranged to pass frequency operating bands that may be used together such that they are connected to a different one of said first and second amplifiers has the advantage that carriers that are required to be used together may be received simultaneously, while the number of amplifiers in the reconfigurable receiver is reduced. This may be achieved by arranging the reconfigurable receiver circuit such that receiver filters passing frequency operating bands that are required to be used together are not connected to a signal path leading to the same tuneable amplifier.

In accordance with a second aspect of the present invention, there is provided a method of receiving at least one carrier in a wireless communications terminal, the wireless communications terminal being arranged to receive at least two carriers, each of said two carriers being transmitted in a different one of a plurality of operating frequency bands, each of the plurality of operating frequency bands occupying a part of a first or a second frequency range, the second frequency range being different from the first frequency range, the method including:

filtering received signals including the at least one carrier using a plurality of receiver filters, including at least a first receiver filter, a second receiver filter, a third receiver filter and a fourth receiver filter, wherein the first receiver filter is arranged to pass signals in a first operating band within the first frequency range and the second receiver filter is arranged to pass signals in a second operating band within the second frequency range, the third receiver filter is arranged to pass signals within a third operating frequency band, and a fourth receiver filter arranged to pass signals within a fourth operating frequency band;

connecting the output of the first receiver filter to a signal path leading to the input of a first tuneable amplifier, connecting the output of the second receiver filter to a signal path leading to the input of the first tuneable amplifier, connecting the output of the third receiver filter to a signal path leading to the input of a second tuneable amplifier and connecting the output of the fourth receiver filter to a signal path leading to the input of the second tuneable amplifier; and selecting the operating frequency range of the first tuneable amplifier to include the operating frequency band of the at least one carrier, the operating frequency range of the first tuneable amplifier being selectable between at least the first and the second frequency range and the operating frequency range of the second tuneable amplifier between at least the first and second frequency range, wherein at least two of said first, second, third and fourth receiver filters are arranged to pass frequency operating bands that may be used together and are arranged to be connected to a different one of said first and second amplifiers.

Further features and advantages of the invention will be apparent from the following description of preferred embodiments of the invention, which are given by way of example only.

DETAILED DESCRIPTION

By way of example an embodiment of the invention will now be described in the context of a wireless communications system supporting communication using E-UTRA radio access technology, as associated with E-UTRAN radio access networks in LTE systems. However, it will be understood that this is by way of example only and that other embodiments may involve wireless networks using other radio access technologies, such as UTRAN, GERAN or IEEE802.16 WiMax systems or a combination of multiple radio access systems with a single or multiple SIM/USIM.

An embodiment of the invention relates to a reconfigurable radio frequency circuit, which may include a radio Frequency Integrated Circuit (RFIC), for use in a wireless communications terminal, to allow appropriately filtered signal paths to be configured for reception of radio frequency signals, that is to say carriers, which may, for example, have been transmitted using carrier aggregation in the same or different frequency bands. The terminal may also be required to be configured for use in multi-SIM (Subscriber Information Module) operation, in which data or paging signals may be received using several carriers, each carrier typically relating to a respective SIM or USIM (Universal Subscriber Information Module), the carriers being in either the same or different operating frequency bands.

Figure 1:
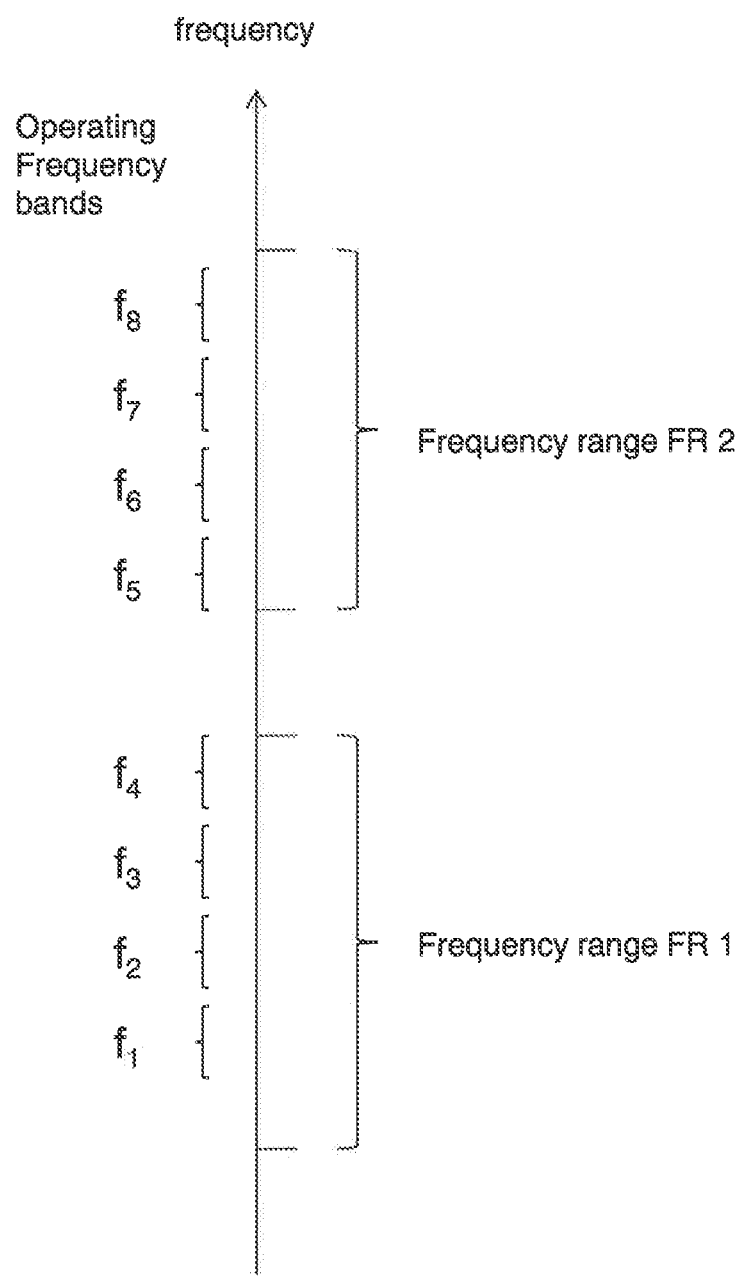
FIG. 1 is a schematic diagram illustrating an example of an arrangement of operating frequency bands and frequency ranges in an embodiment of the invention.

Carriers for reception by the reconfigurable radio frequency circuit may, for example, be received in operating frequency bands and frequency ranges arranged as illustrated by FIG. 1. Frequency ranges FR1 and FR2 may be, for example, two ranges from the following non-exhaustive list of ranges: a low band nominally 700-900 MHz: a mid band nominally 1400-1600 MHz; a band encompassing 1650 MHz; a high band nominally 1700-2200 MHz; a very high band nominally 2300-2700 MHz; and an ultra high band 3400-3800 MI-Hz. Further ranges at approximately 5 GHz and above may also be used, for example. Within each frequency range, there may be one or more of the operating frequency bands; in FIG. 1, operating frequency bands $f_1$ to $f_4$ are shown within the first frequency range FR1 and operating frequency bands $f_5$ to $f_8$ are shown within the second frequency range FR2. In some embodiments operating frequency ranges may overlap each other. Within each operating frequency band, there may be one or more carriers. The carriers may be component carriers transmitted using carrier aggregation, for example, or carriers for multi-SIM use.

Figure 2:
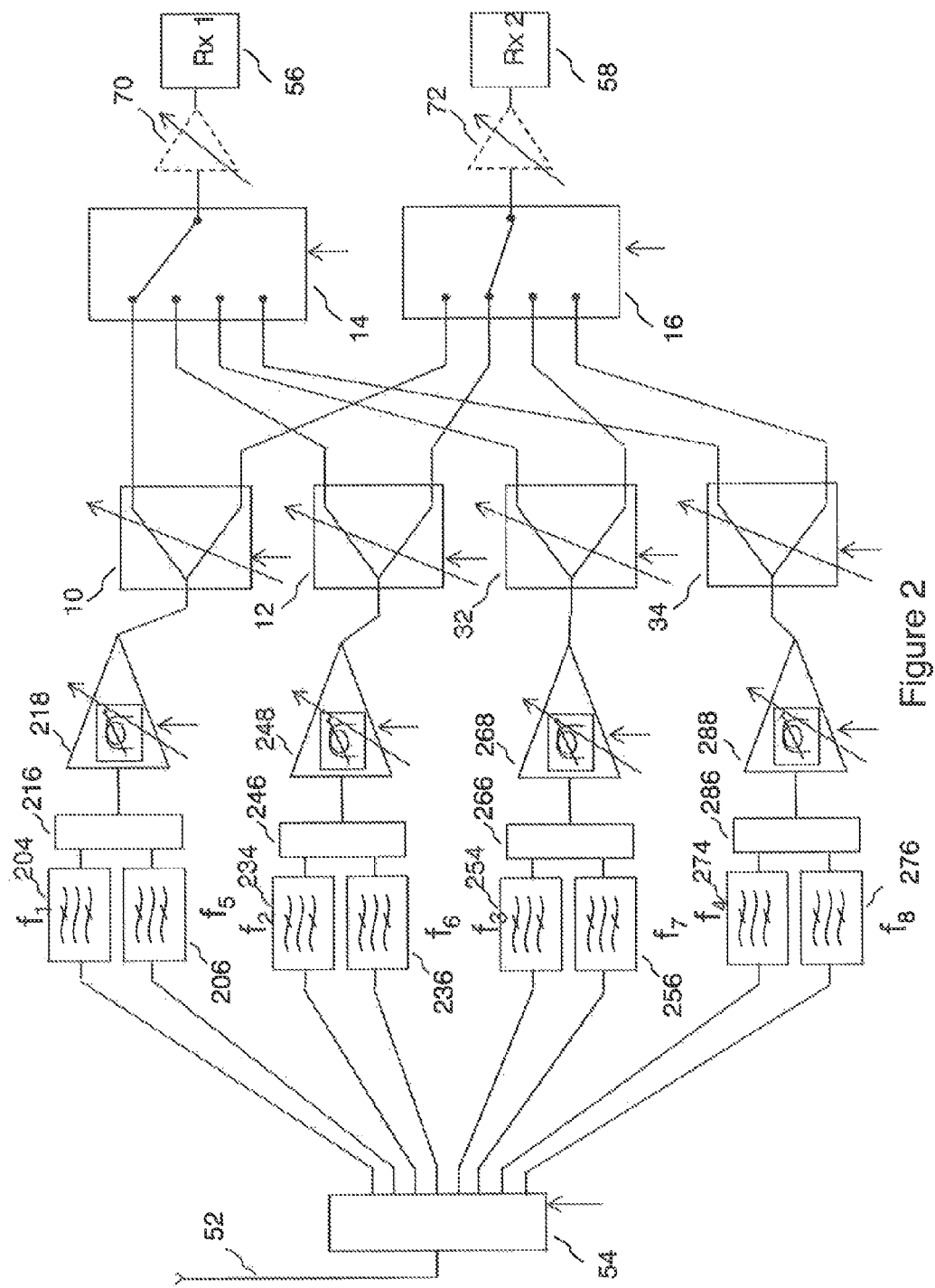
FIG. 2 is a schematic diagram showing a reconfigurable receiver in an embodiment of the invention.

FIG. 2 shows a reconfigurable receiver in an embodiment of the invention arranged to receive, in this example, two carriers that may be within the frequency bands $f_1$ to $f_8$. It will be seen from FIG. 2 that receiver filters 204, 206, 234, 236, 254, 256, 274, 276 are arranged in pairs, each pair being connected in a signal path to a respective amplifier 218, 248, 268, 288. The receiver filters are typically band pass front end filters, and may be the receive parts of duplexers or triplexers, and may be filters with fixed or tunable frequency responses, each arranged to pass carriers within a respective operating frequency band. In FIG. 2, for clarity, the transmitter paths and components are not shown. Amplifiers (e.g. 218, 248, 268,288, 70, 72) may have adjustable gain with controls which may be used as a part of reception path as automatic gain control (AGC). It will be seen from FIG. 2 that the arrangement of the filters in pairs is such that, in a pair, one receiver filter is arranged to receive a carrier within an operating band within the first frequency range FR1, and the other receiver filter of the pair is arranged to receive a carrier within an operating band within the second frequency range FR2. The output of each filter in a pair is connected, in the operating frequency band of the respective filter, by a respective combiner 216, 246, 266, 286 to a signal path leading to the input to the respective amplifier 218, 248, 268, 288. The amplifier, typically a tuneable amplifier, has an operating frequency range that is selectable at least between the first frequency range FR1 and the second frequency range FR2. In an embodiment of the invention, not all operating frequency bands need to have tuneable amplifiers, for example only a subset of the amplifiers 218, 248, 268, 288 may have a selectable tuning range.

Control of the operating frequency range of an amplifier, or the gain of an amplifier, may be in analogue or digital format. Control signals may be generated by, for example, firmware, a modem processor, an application processor, or a special purpose processor.

Figure 3:
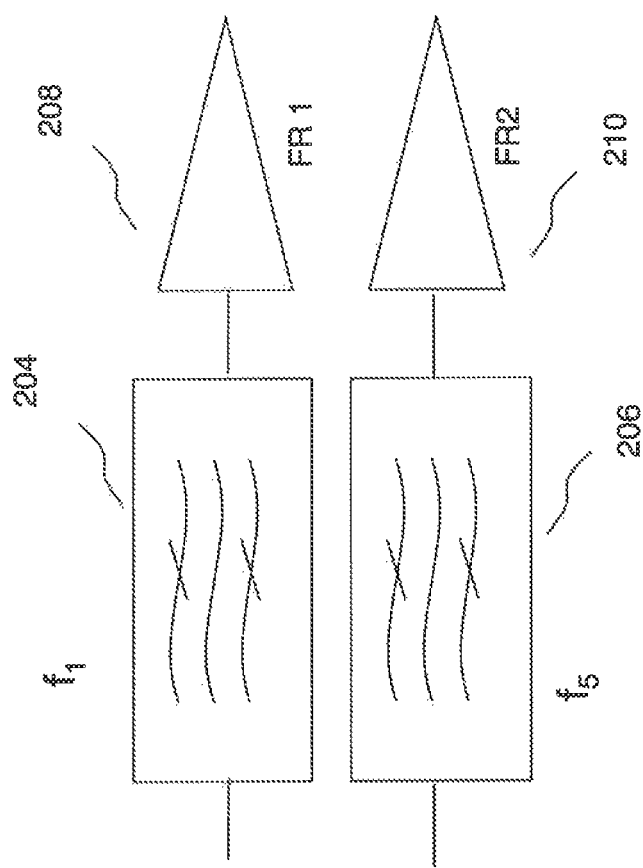
FIG. 3 is a schematic diagram showing a prior art arrangement of receiver filters and amplifiers.

FIG. 3 shows a conventional arrangement of receiver filters and amplifiers, in which, by contrast to the arrangement of FIG. 2, each receiver filter 204, 206 is connected to its own dedicated amplifier 208, 210. In the example of FIG. 3, a first receiver filter 204 with a pass band corresponding to a first operating frequency band $f_1$ within a frequency range FR1 is connected to a amplifier with a fixed operating range within the frequency range FR1, and a second receiver filter 206 with a pass band corresponding to a second operating frequency band $f_5$ within a frequency range FR2 is connected to a second amplifier with a fixed operating range within the frequency range FR2. The output of each amplifier may be connected to a respective receiver, or the output of each amplifier may be connected to a radio frequency switch arrangement for connection to a respective receiver.

It may be seen that the conventional arrangement of FIG. 3 may allow carriers to be received within the first operating band and the second operating band at the same time, if the amplifiers are connected to appropriate receivers. However, the conventional arrangement of FIG. 3, if applied to the reconfigurable receiver arrangement of FIG. 2, would result in a greater number of amplifiers than the number of amplifiers required according to embodiments of the invention.

Embodiments of the invention accordingly have an advantage that fewer amplifiers are required to implement a reconfigurable receiver. This is particularly advantageous in terms of reducing circuitry and therefore surface area of a Radio Frequency Integrated Circuit (RFIC). Typically the cost of a RFIC is related to its surface area.

In the embodiment of the invention shown in FIG. 2, it is typically not possible to receive carriers within a first operating band and a second operating band at the same time, when the receiver filters corresponding to the first and second operating bands are connected as a pair to a single tuneable amplifier. This is because the amplifier may have its operating frequency range set to either a first range including the first operating band or to a second frequency range including the second operating frequency range. As a solution to this potential limitation, the second operating frequency band is arranged to be an operating frequency band not required for use in receiving a carrier at the same time as the first operating band is required for receiving a carrier. This has the advantage that carriers that are required to be used together may be received simultaneously, while the number of amplifiers in the reconfigurable receiver is reduced. This is achieved by arranging the reconfigurable receiver circuit such that receiver filters passing frequency operating bands that are required to be used together are not connected to a signal path leading to the same tuneable amplifier.

Referring to FIG. 2, it can be seen that operating frequency bands $f_1$ and $f_5$, $f_2$ and $f_6$, $f_3$ and $f_7$, and $f_4$ and $f_8$, have been arranged in pairs, where each pair includes an operating frequency band in a first frequency range and another operating frequency band in a second, different, frequency range. The frequency ranges for each pair are arranged so that the first and second frequency ranges are not required to be used to receive carriers at the same time. For example, only one of the first or second frequency ranges may be allocated in a given territory. As another example, the reconfigurable receiver may be for receiving carriers transmitted using carrier aggregation, in which case the pairs of receiver filters would be arranged so that carriers passed by one filter of the pair would not be aggregated with a carrier passed by the other filter of the pair, according to the carrier aggregation scheme. So, the first and second frequency ranges may be arranged to be frequency ranges between which carriers are not aggregated.

As a further example, the reconfigurable receiver may be for receiving carriers that are received from different base stations for use in handover, in a dual radio handover scheme involving receiving two carriers simultaneously, in which case the pairs of receiver filters would be arranged so that carriers passed by one filter of the pair would not be involved in handover with a carrier passed by the other filter of the pair. So, the first and second frequency ranges may be arranged to be frequency ranges between which carriers are not handed over.

In an embodiment of the invention, the first operating frequency band is arranged to receive cellular communications signals and the second operating frequency band is not arranged to receive cellular communication signals. For example, the second operating frequency band may be arranged to receive satellite navigation/positioning signals, or to receive signals of a wireless access system different from the cellular communications signals, such as IEEE802.11 WiFi or to operate alternate cellular communications signals with different SIM/USIM than that used by a first cellular communications signals, in circumstances where the first and second operating bands are not required to be used at the same time.

In an embodiment of the invention, the second operating frequency band is arranged to receive network measurement signals and/or network based positioning measurement signals when the first operating frequency band is not used for reception. These network measurement signals may be for example signals of a different communication system, and may for example be used for measurement of a radio channel. Network based positioning measurement signals may be used in an OTDOA (Observed Time Difference of Arrival) system.

In some embodiments all communication systems may use the same SIM/USIM. In alternative embodiments, communication systems may have two or more SIM/USIM used for subscriber identification.

Returning to FIG. 2, it can be seen that carriers received at one or more antennas 52 may be connected to the inputs of the filters via an antenna switching arrangement 54. The antenna switching arrangement may include a coupling arrangement that may be, for example, a conventional arrangement including a predefined strip-line with certain length and line impedance, which are computed, for example, from magnitudes and phases of the reflection coefficients the filters characterized at given frequencies, which may be arranged to connect signals at relatively low loss to a respective filter within the pass band of the filter, but to provide isolation to a filter at the pass band of the other filter to which the coupling arrangement is connected. Typically, various electrical components such as matching circuits, control interfaces, power supplies, controllers, bias circuits, filters and switches may be integrated as one or more modules. In some embodiments the antenna switching arrangement 54 may connect one or more predefined filters concurrently to one or more antennas. Alternatively, the input to each filter may be received separately by each of an array of antennas. In this case, for example, the coupling arrangement may be omitted; this may be the case for any of the embodiments of the invention. The combiner 216, 246, 266, 286 may be implemented in a similar manner to the coupling arrangement, for example a conventional combination may use a predefined strip-line with certain length and line impedance, which are computed from magnitudes and phases of the reflection coefficients the filters' characterize at given frequencies.

The amplifier 218, 248, 268, 288 may be arranged to have a selectable operating range by arranging a resonator coil (inductor) to have two or more selectable tapping points with controls. The amplifier is typically a Low Noise Amplifier (LNA), arranged to have a lower Noise Figure (NF) in the first frequency range than in the second frequency range when the first frequency range is selected, and a lower Noise Figure (NF) in the second frequency range than in the first frequency range when the second frequency range is selected.

As shown in FIG. 2, the amplifiers are situated in a position preceding signal dividers 10, 12, 32, 34, one output of each being connected to a first radio frequency switch 14 and the other output of each being connected to a second radio frequency switch 16. The first radio frequency switch 14 selects a signal path from one of the amplifiers 218, 248, 268, 288 for connection to a first receiver circuit 56. The second radio frequency switch 16 selects a signal path from one of the amplifiers 218, 248, 268, 288 for connection to a second receiver circuit 58. The signal dividers 10, 12, 32, 34 may each have a controllable divide ratio. If for example, two carriers are received within the same operating frequency band, they are typically amplified by the same amplifier 218, 248, 268, 288 and the divider following the amplifier may be set to divide the incoming signal substantially equally, so that the signal can be provided to each radio frequency switch 14, 16. In this way, one of the carriers may be received by each of the two receiver circuits. If, however, the output of an amplifier has a signal with one carrier only, the divider following the amplifier may be set to provide the signal preferentially to one radio frequency switch, the switch being connected to the receiver circuit intended to receive the amplified carrier.

A low noise amplifier 70, 72 may be provided in the path from each radio frequency switch to each receiver, but this is typically disabled if the amplifiers 218, 248, 268, 288 preceding the radio frequency switches are enabled. Typically each amplifier and filter path characteristic may be controlled with a predefined Automatic Gain Control (AGC) algorithm. The AGC algorithm may adjust gain controls of the amplifiers 218, 248, 268, 288, 70, 72 and/or controllable dividers 10, 12, 32, 34 according to signal strength, wide band blocking powers, narrow band blocking powers, signal to noise ratio, signal to interference ratios, number of carriers, band width, operational frequency, as examples. The adjusted output characteristics may be gain, attenuation, Noise Figure (NF), band width, corner frequency, for example.

If, for example, carrier aggregated signals using carriers within operating frequency bands $f_1$ and $f_2$ are to be received, the amplifier 218 connected to the filter for passing $f_1$ is set to select frequency range FR1 that includes $f_1$ and the amplifier 248 connected to the filter for passing $f_2$ is also set to select frequency range FR1 that also includes $f_2$. The first radio frequency switch 14 is set to connect signals passed through the filter 204 at $f_1$ to the first receiver 56, and the second radio frequency switch 16 is set to connect signals passed through the filter 234 at $f_2$ to the second receiver 58. The first and second receivers may then receive the carrier aggregated signals transmitted in operating bands $f_1$ and $f_2$.

Figure 4:
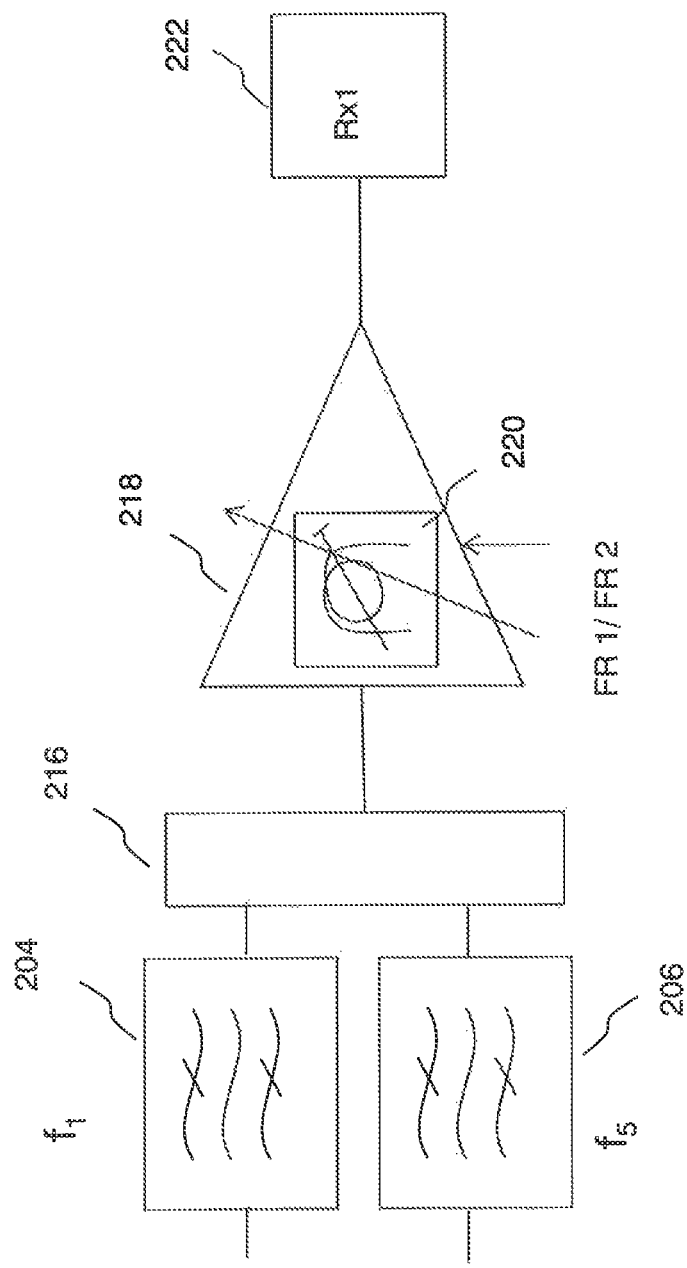
FIG. 4 is a schematic diagram showing an arrangement of receiver filters, a combiner and a tuneable amplifier in an embodiment of the invention.

FIG. 4 shows an arrangement of receiver filters, a combiner and a tuneable amplifier in an embodiment of the invention, as an extract from FIG. 2, for comparison with the prior art arrangement of FIG. 3. In the embodiment of FIG. 4, the operating frequency bands of the first receive filter 204 and the second receive filter 206 are chosen to be bands that are not allocated for simultaneous use. For example, operating band $f_5$ may be chosen to be a band that does not contain component carriers that are allocated for aggregation with component carriers in band $f_1$. Alternatively, operating bands $f_1$ and $f_5$ may be chosen as bands that are not required for dual receiver handover. The amplifier 218 may be arranged to have a selectable operating range by arranging a resonator coil (inductor) 220 to have two or more selectable tapping points with controls.

In FIGS. 5 to 9 filters are shown to be connected to independent antennas. In some embodiments the antenna count may be reduced by sharing antennas. Antenna sharing may be done typically with switches, a diplexer, or a triplexer as example, for example within the antenna switching arrangement 54

Figure 5:
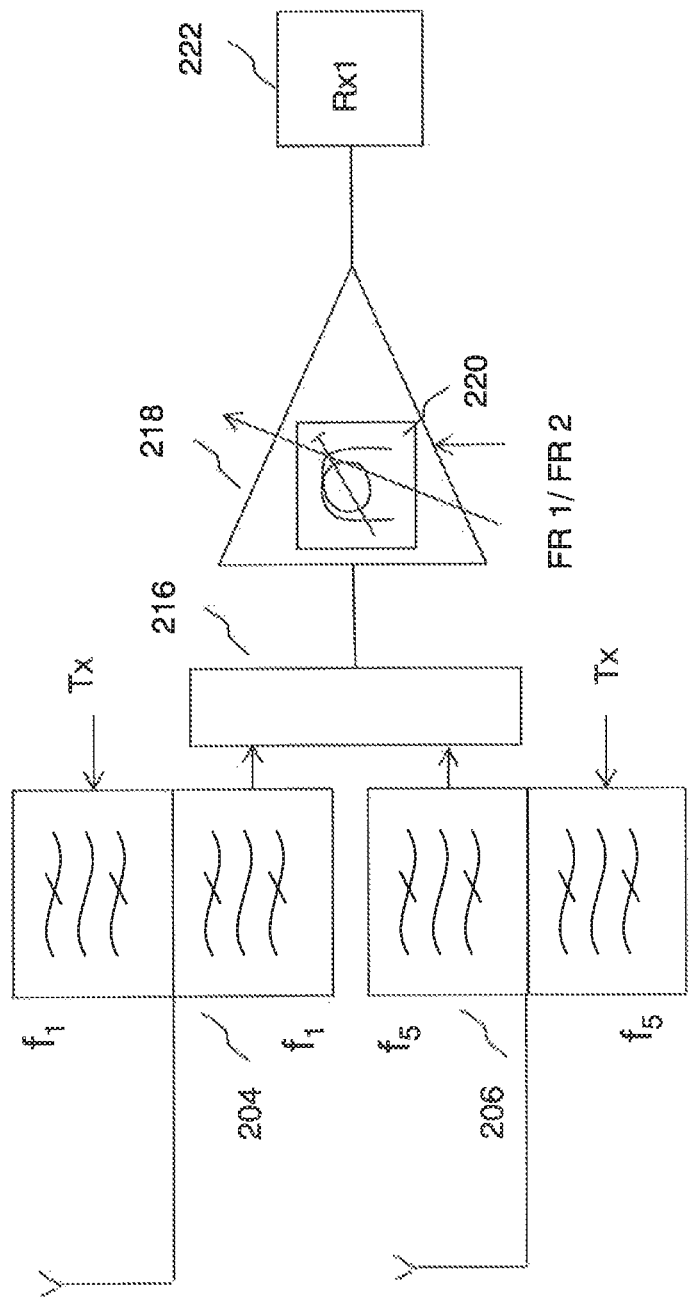
FIG. 5 is a schematic diagram showing an arrangement of receiver filters, a combiner and a tuneable amplifier in an embodiment of the invention, in which the receiver filters are each part of respective duplexer filters.

FIG. 5 shows a variant of the arrangement of FIG. 4, in which the first receiver filter 204 at $f_1$ and the second receiver filter 206 at $f_5$ are each part of respective duplexer filters, connecting both transmit and receive signal paths to respective antennas.

Figure 6:
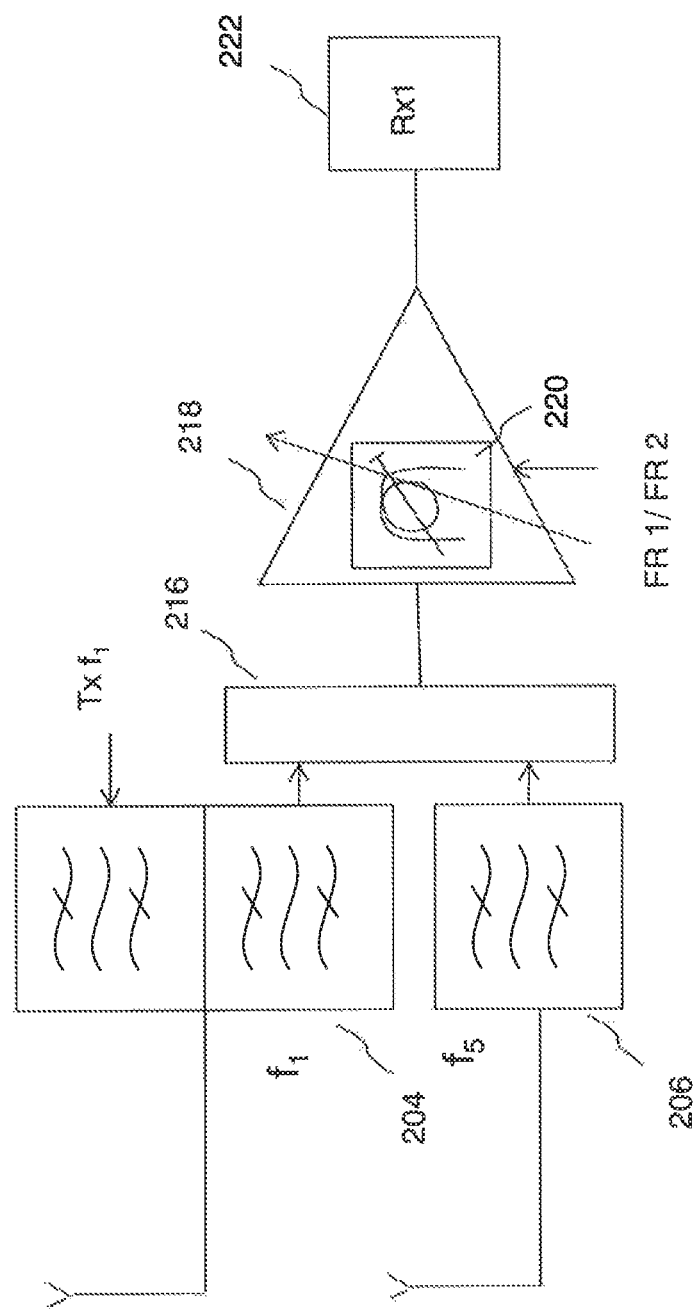
FIG. 6 is a schematic diagram showing an arrangement of receiver filters, a combiner and a tuneable amplifier in an embodiment of the invention, in which one receiver filter is part of a duplexer filter.

FIG. 6 shows a further variant, in which the first receiver filter 204 is part of a duplexer filter, but the second receiver filter 206 is a receive-only filter.

Figure 7:
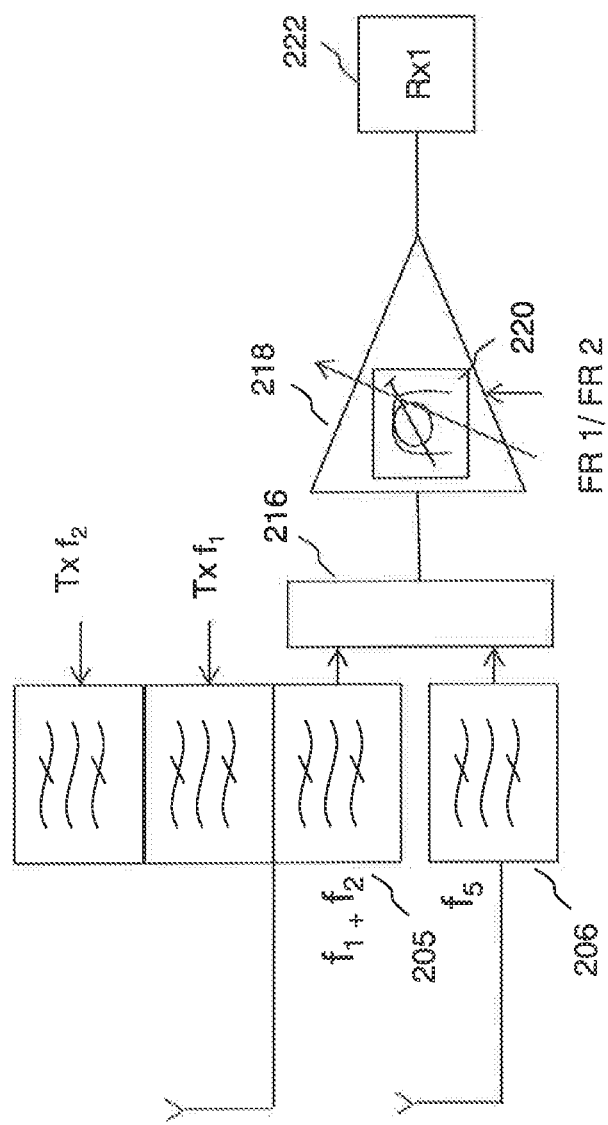
FIG. 7 is a schematic diagram showing an arrangement of receiver filters, a combiner and a tuneable amplifier in an embodiment of the invention, in which one receiver filter is part of a triplexer filter.

FIG. 7 shows another variant, in which the first receiver filter is part of a triplexer filter, in which two frequencies $f_1$ and $f_2$ are transmitted through separate transmit filters, but a single receive filter 205 is provided for both $f_1$ and $f_2$.

Figure 8:
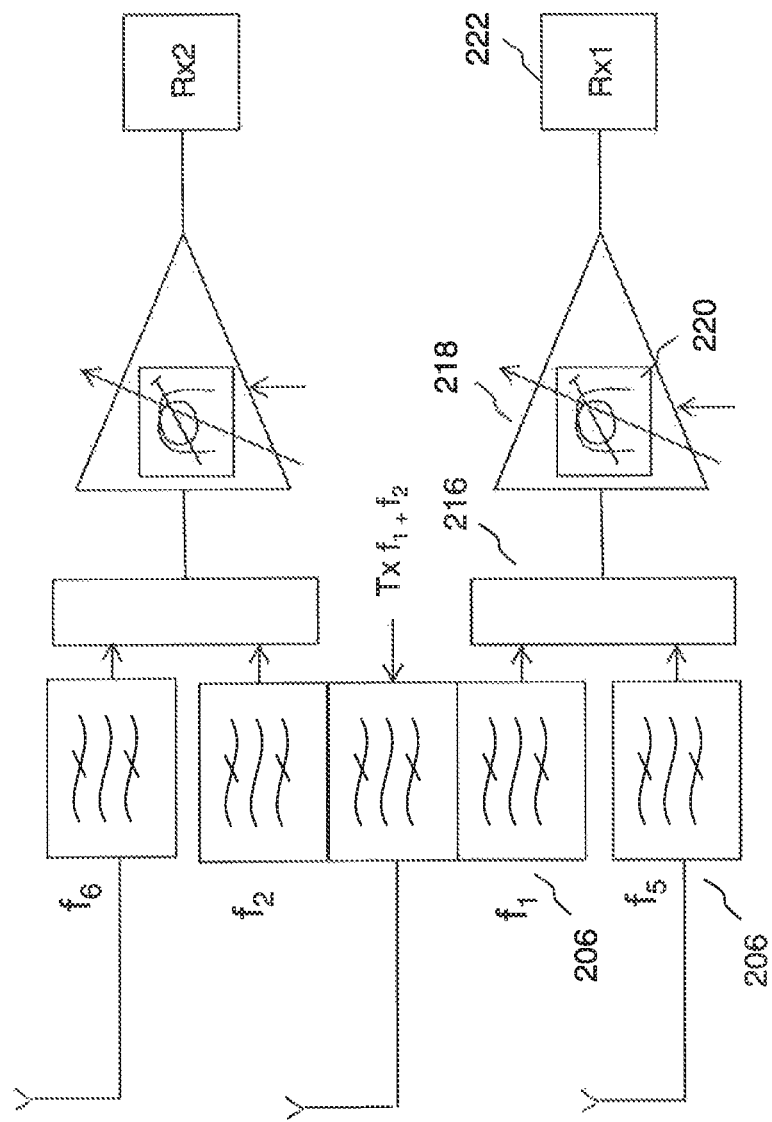
FIG. 8 is a schematic diagram showing an arrangement of four receiver filters, two combiners and two tuneable amplifiers in an embodiment of the invention, in which two of the receiver filters are part of a triplexer filter.

FIG. 8 shows yet another variant, in which a triplexer filter has two receiver filters, and these are connected to different amplifiers.

Figure 9:
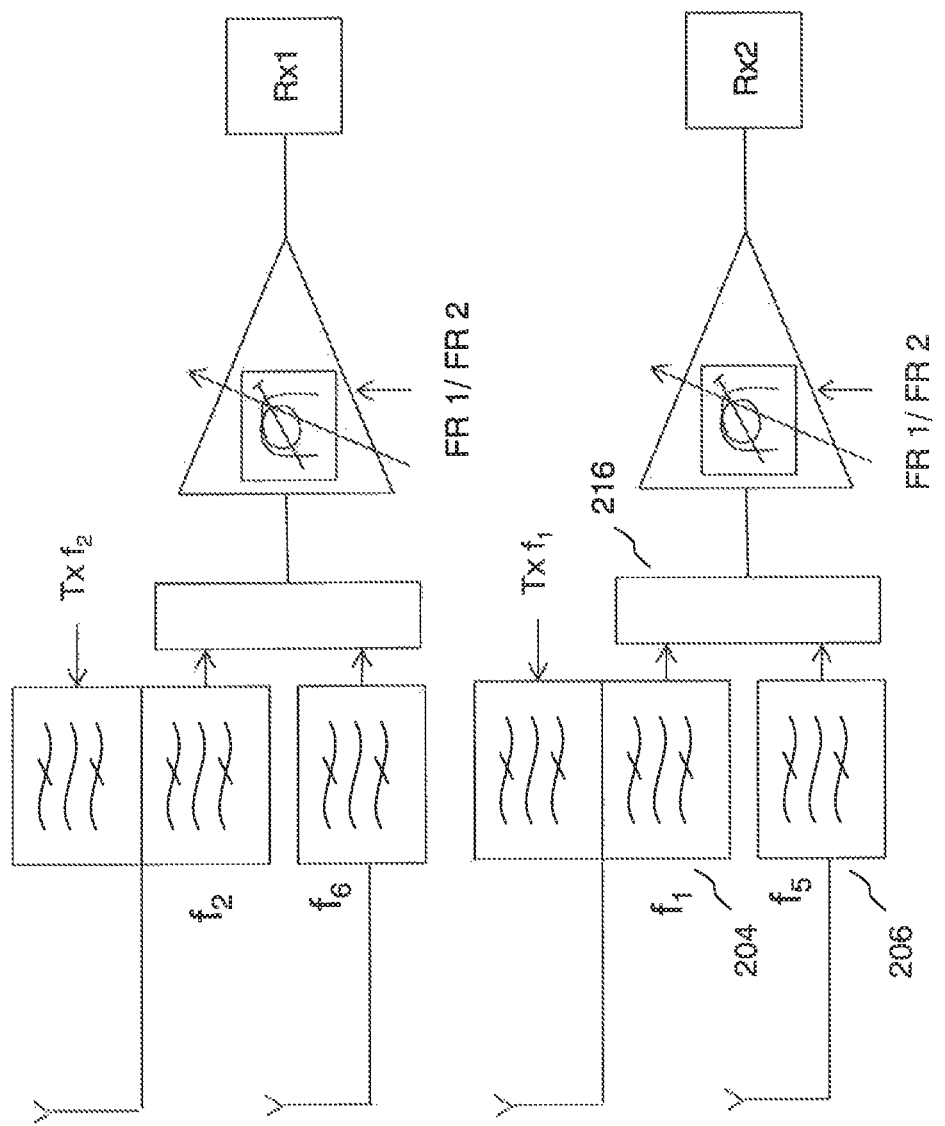
FIG. 9 is a schematic diagram showing an arrangement of four receiver filters, two combiners and two tuneable amplifiers according to an embodiment of the invention, in which two of the receiver filters are parts of respective duplexer filters in an embodiment of the invention.

FIG. 9 is a schematic diagram showing an arrangement of four receiver filters, two combiners and two tuneable amplifiers according to an embodiment of the invention, in which two of the receiver filters are parts of respective duplexer filters in an embodiment of the invention. FIG. 9 shows how two arrangements as shown in FIG. 6 may be connected to signal paths leading to respective receivers.

Figure 10:
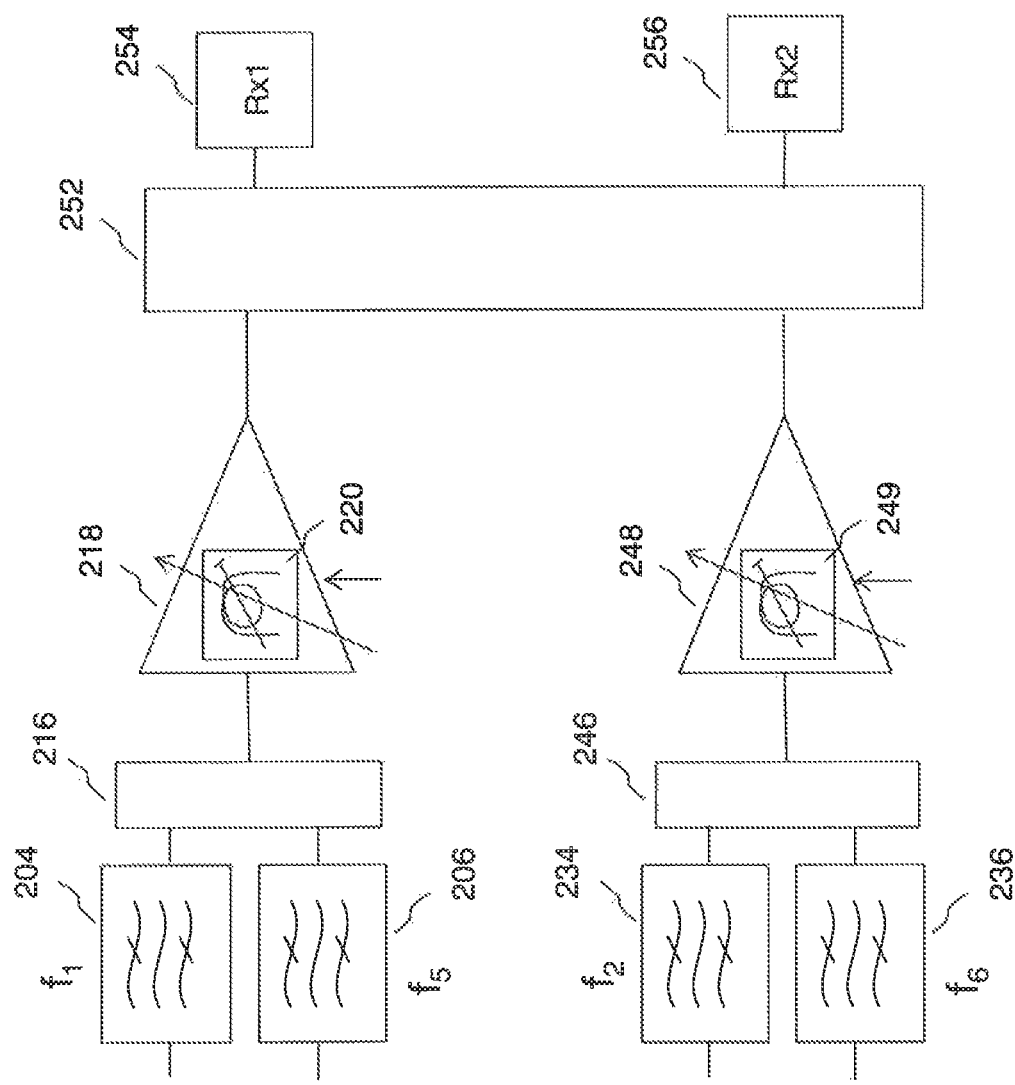
FIG. 10 is a schematic diagram showing a combination of two of the circuits illustrated in FIG. 4 with a radio frequency switching arrangement by which either may be connected to a first or second receiver in an embodiment of the invention.

FIG. 10 is a schematic diagram showing a combination of two of the circuits illustrated in FIG. 4. First receiver filter 204, arranged to pass carrier frequencies within a first operating frequency band in a first frequency range, and second receiver filter 206, arranged to pass carrier frequencies within a second operating frequency band in a second frequency range are connected to a first combiner 216. Similarly, third receiver filter 234, arranged to pass carrier frequencies within a third operating frequency band in the first frequency range, and fourth receiver filter 206, arranged to pass carrier frequencies within a fourth operating frequency band in the second frequency range are connected to a second combiner 246.

The first combiner 216 is arranged to connect the output of the first receiver filter at the first operating frequency band to a signal path leading to the input of a first amplifier 218, and also to connect the output of the second receiver filter at the second operating frequency band to a signal path leading to the input of the first amplifier 218. The second combiner 246 is similarly arranged to connect the output of the third receiver filter at the third operating frequency band to a signal path leading to the input of a second amplifier 248, and also to connect the output of the fourth receiver filter at the fourth operating frequency band to a signal path leading to the input of the second amplifier 248. The first and second amplifiers 218, 248 have operating frequency ranges that are selectable between at least the first frequency range and the second frequency range.

According to embodiments, at least two of the first, second, third and fourth receiver filters are arranged to pass frequency operating bands that may be used together. By arranging the connections between the receiver filters and the combiners such that receiver filters that are arranged to pass frequency operating bands that may be used together are connected to a different one of the first and second amplifiers 218, 248. In this manner, the present invention is able to provide a receiver topology that both reduces the number of amplifiers required and allows combinations of carriers that may be used together to be received simultaneously For example, receiver filters 204 and 234 may pass frequencies in operating frequency bands that may be used together, for example for receiving carriers transmitted using carrier aggregation, and are therefore are arranged to be connected to different amplifiers 218, 248.

In the embodiments shown in FIG. 10, the circuit further includes a radio frequency switching arrangement 252 by which the output of either amplifier may be connected to a first or second receiver 254 and 256. In alternative embodiments, the output of amplifier 218 may be connected directly to the input of receiver 254, and the output of amplifier 248 may be connected directly to the input of receiver 256.

Figure 11:
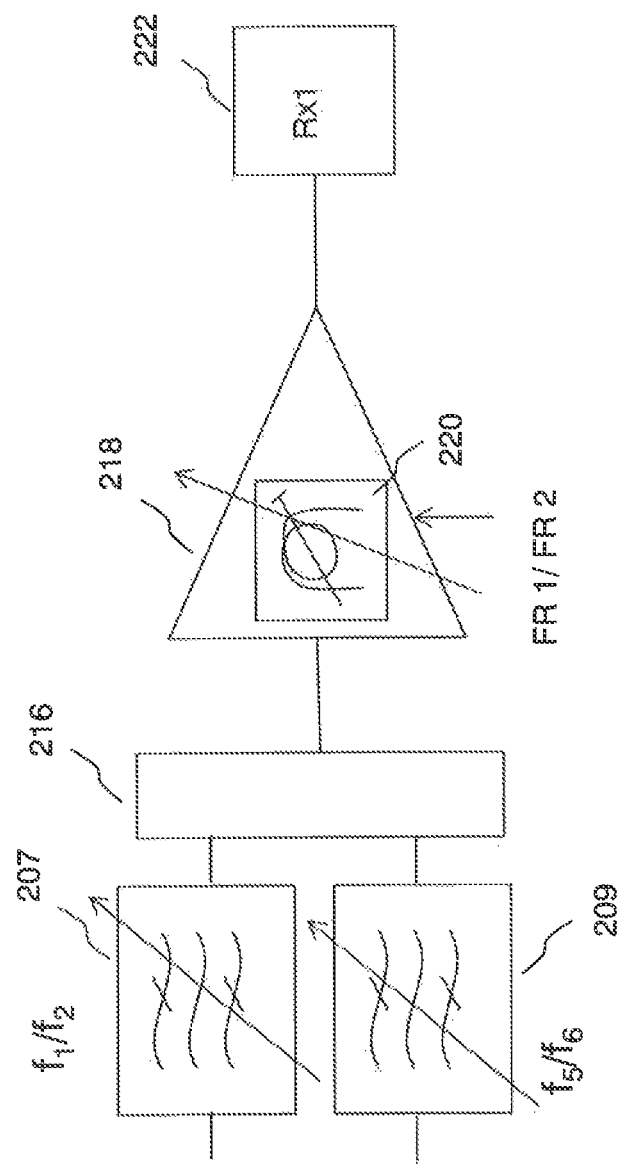
FIG. 11 illustrates a variant of the arrangement of FIG. 4, in which each receiver filter is tuneable within a frequency range in an embodiment of the invention.

FIG. 11 illustrates a variant of the arrangement of FIG. 4, in which the first receiver filter frequency response is tuneable within at least parts of the first frequency range, and the second receiver filter frequency response is tuneable within at least parts of the second frequency range, in an embodiment of the invention.

Figure 12:
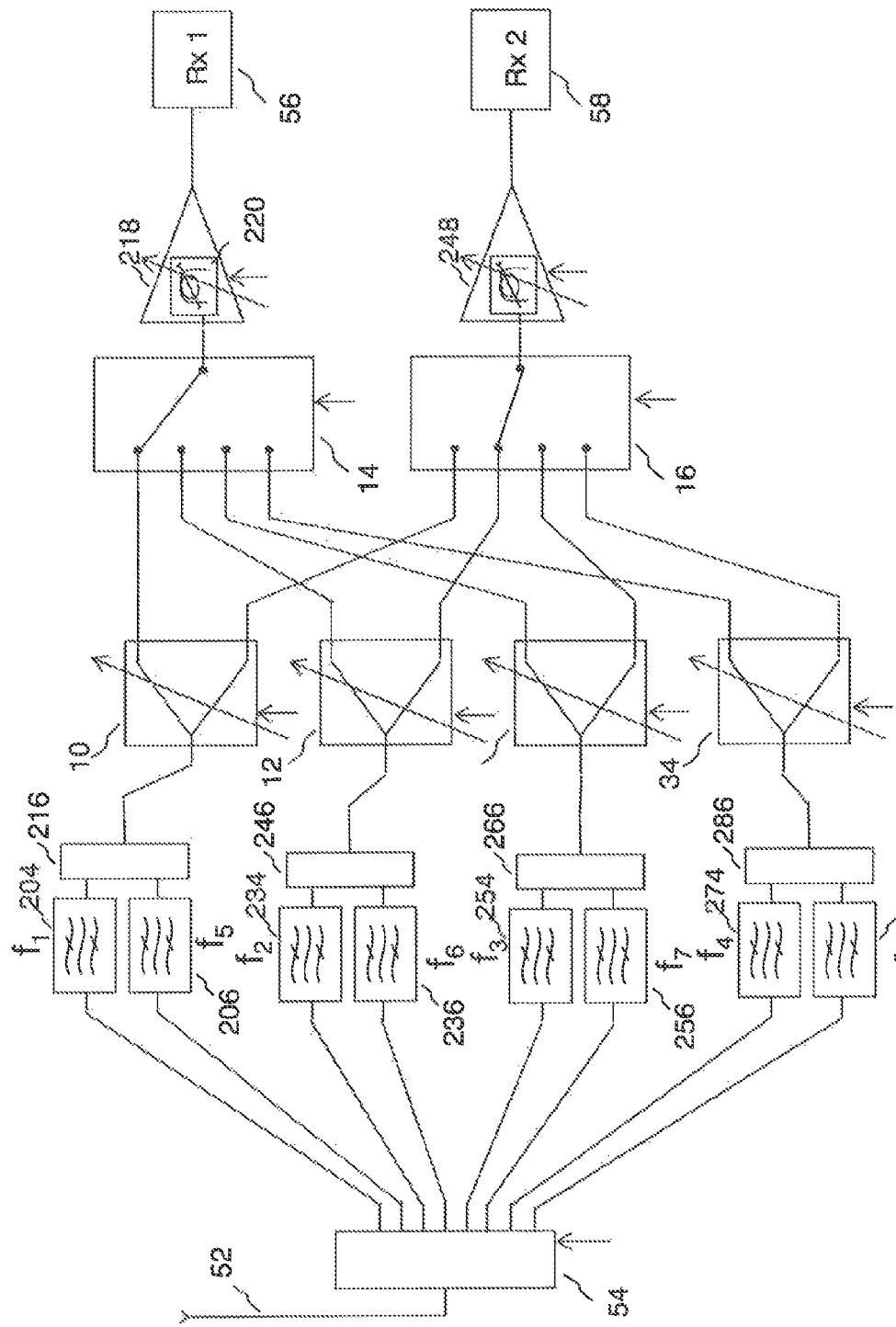
FIG. 12 illustrates a variant of the reconfigurable receiver of FIG. 3 in which the tuneable amplifiers follow a radio frequency switch in a receiver signal path in an embodiment of the invention.

FIG. 12 illustrates a variant of the reconfigurable receiver of FIG. 2 in which the tuneable amplifiers 218, 248 each follow the respective radio frequency switch 14, 16 in a signal path to the respective receiver 56, 58.

Figure 13:
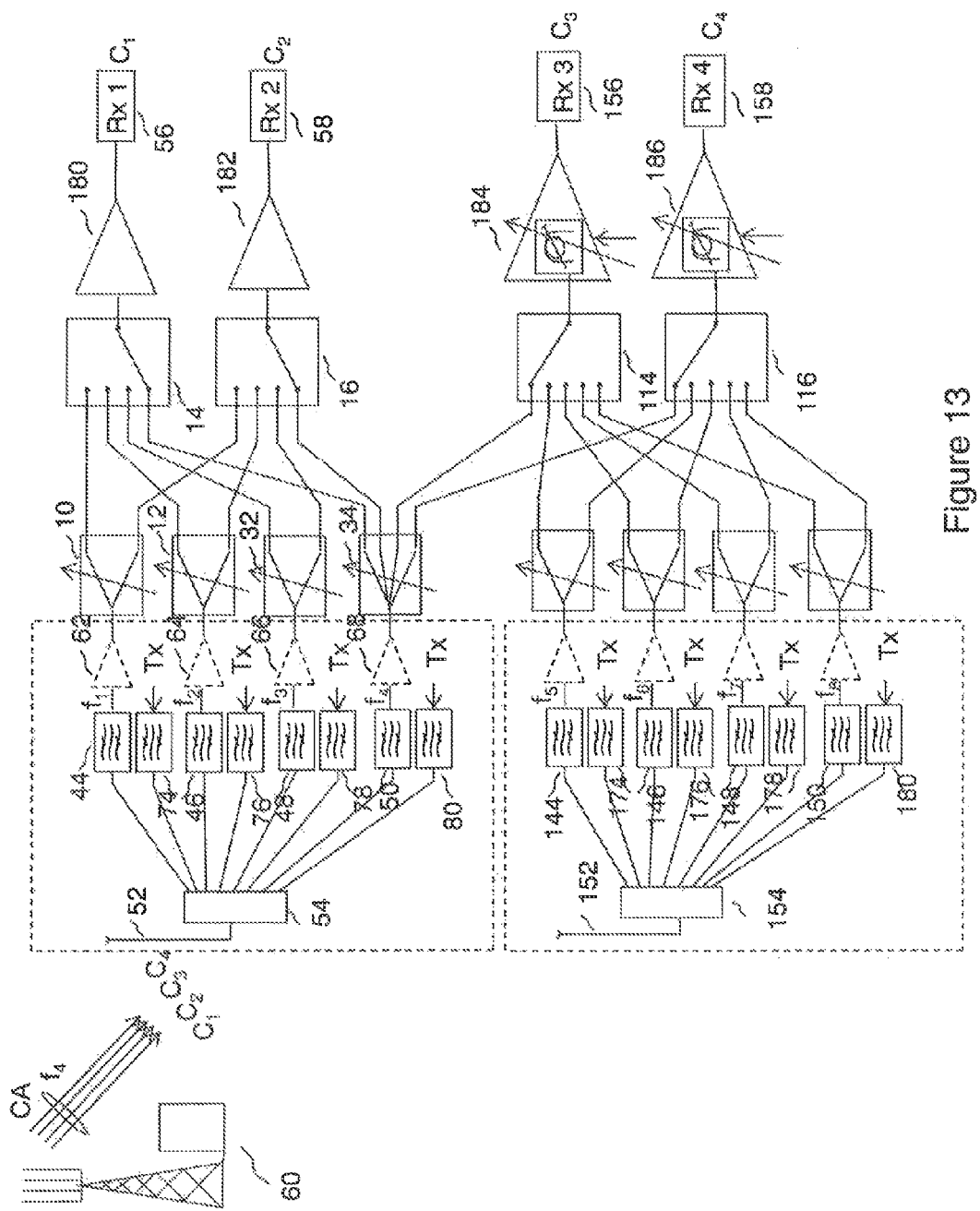
FIG. 13 is a schematic diagram showing a reconfigurable receiver for receiving four carrier aggregated signals in a single operating frequency band in an embodiment of the invention.

FIG. 13 is a schematic diagram showing a reconfigurable receiver for receiving, for example, up to four carrier aggregated signals in a single operating frequency band in an embodiment of the invention. It can be seen that at least one four-way divider 34, which may be controllable to divide according to programmable proportions, is used to split signals received from a receiver filter 50 at a first frequency range FR1 for distribution to four radio frequency switches 14, 16, 114, 116. Two of the radio frequency switches 14, 16 may be connected to fixed frequency range amplifiers 180, 182 arranged to operate in the first frequency range, connected to respective receivers 56, 58 for receiving carriers in the first frequency range. In the embodiment illustrated in FIG. 13, the other two radio frequency switches 114, 116 may be connected to selectable frequency amplifiers 184, 186 arranged to be selectable to operate in the first or second frequency range, connected to respective receivers 156, 158 for receiving carriers in the first or second frequency range. As illustrated in the example of FIG. 13, four carriers C1, C2, C3, C4 are transmitted from base station 60 using carrier aggregation within operating frequency band $f_4$. The four carriers are received at antenna or multiple antenna arrangement 52, and then pass through the antenna switching arrangement 54 to receiver filter 50 which is arranged to pass frequencies within operating band ft. Signals from the filter 50 are split four ways in the divider 34, and are selected by the radio frequency switches 14, 16, 114 and 116 to be passed to the receivers 56, 58, 156, 158.

This has an advantage that, if carrier aggregation is required at one frequency range with a larger potential number of carriers than at another frequency range, this may be accommodated by use of selectable frequency amplifiers as illustrated by FIG. 13. Additionally, embodiments may be extended or reduced in terms of the numbers of carriers that may be received within a frequency range, by provision of switches and dividers with an appropriate number of ways, according to communication resources needed for radio communication. In FIG. 13, the filtering arrangements shown in FIGS. 2 to 9 may be substituted for the arrangement shown, so, for example, the filters 44, 46, 48, 50, 74, 76, 78, 80, 144, 146, 148, 150, 174, 176, 178, 180 may be all or parts of diplexer or triplexer filters.

Figure 14:
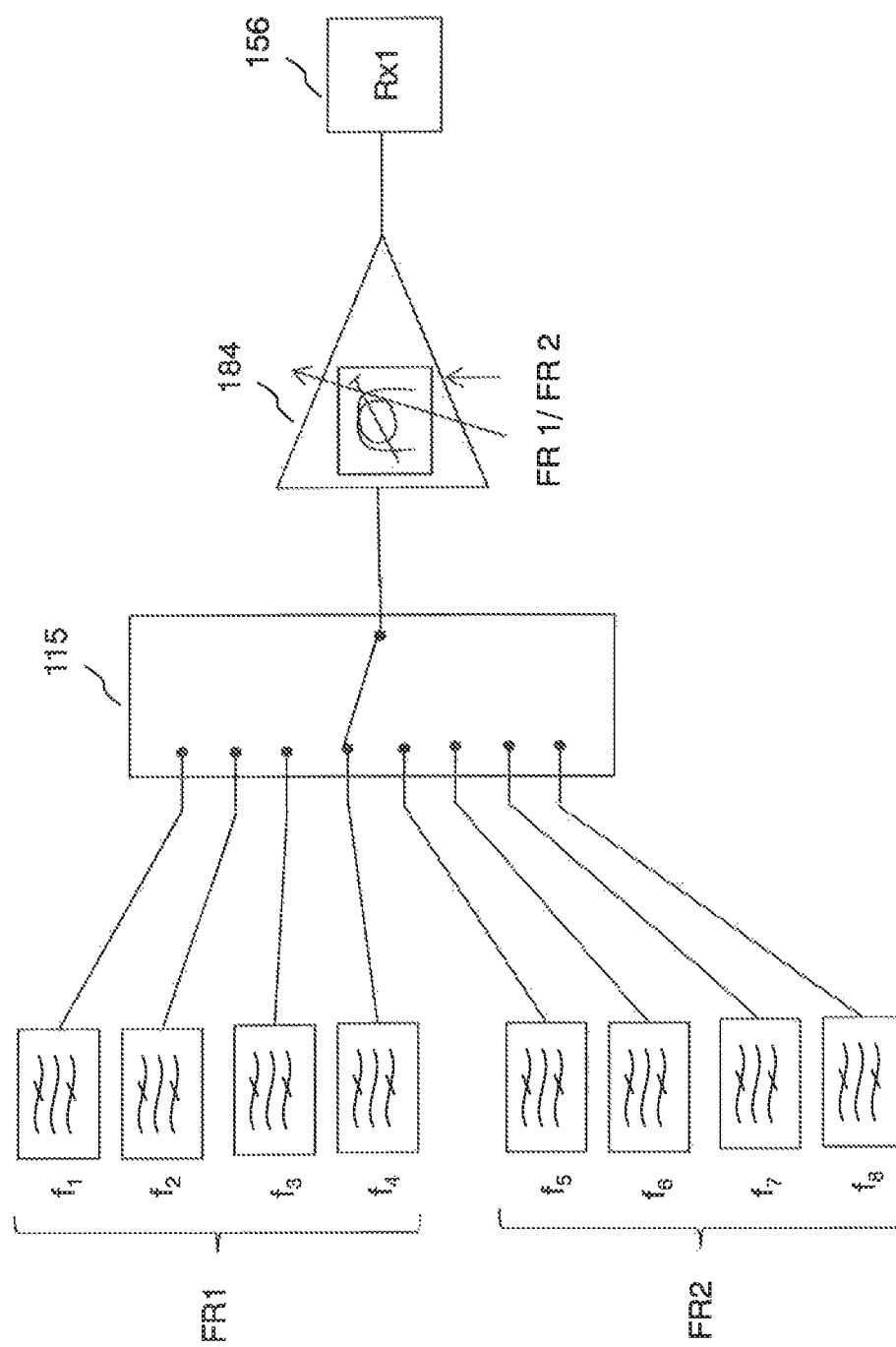
FIG. 14 is a schematic diagram showing a radio frequency switch capable of selecting signals from receiver filters within more than one frequency range for connection to a tuneable filter, for use in a reconfigurable receiver in an embodiment of the invention.

FIG. 14 is a schematic diagram showing a radio frequency switch capable of selecting signals from receiver filters within more than one frequency range for connection to a tuneable filter, for use in a reconfigurable receiver in an embodiment of the invention. The switch 115 of FIG. 14, or for example a SP6T (single pole six throw) variant, may be used in place of each of switches 114 and 116, and each of the signal dividers 10, 12, 32 could be replaced with four way dividers, so that each divider connected to the FR1 section is connected to each switch 114, 116 connected to the selectable frequency amplifiers 184, 186 and receivers 156, 158 for receiving carriers in the first or second frequency range. In this way, up to four carriers at the first frequency range may be received.

In the arrangement illustrated in FIG. 13, the circuit may be configured to a first mode for use when at least two carriers are within a first frequency range. The first radio frequency switch 14 is for connecting received carriers to a first receiver chain 180, 56 for passing carrier frequencies within the first frequency range in the first mode, the first receiver chain including an amplifier 180 arranged to operate in the first frequency range. The second radio frequency switch 114 is for connecting received carriers to a second receiver chain 184, 156 for passing carrier frequencies within the first frequency range in the first mode, the second receiver chain including a tuneable amplifier 184 having a selectable operating frequency range, the operating frequency range being selectable between the first and second frequency range. The operating range of the tuneable amplifier 184 is arranged to be set to the first frequency range in the first mode, so that one of the received carriers within the first frequency range may be received. This provides extra capacity to receive carriers in the first frequency range. It may be that there is no requirement for extra capacity in the second frequency range, in which case there is no need for the amplifiers 180, 182 which only operate at the first frequency range to be tuneable.

In an embodiment of the invention, a terminal may operate in a multi-SIM operational mode, in which the terminal may receive paging signals from more than one communication system and the terminal may have radio communication links with a second communication system when a first communication system is active. Communication may be with communication counterparts that have the same or different operators, the same or different base stations, or that may be another terminal. Typically there may be two or more uplink transmission links and downlink reception links. In some geographical areas these different radio communication links may operate at the same radio frequency range allocation, which may be appropriate to 2G (second generation), 3G (third generation), HSPA. LTE, LTE-A, or CDMA systems for example. As an example, the terminal may use two or more of the following systems operating in a frequency range at approximately 900 MHz: GSM900, B8 3G, B8HSPA, B8 LTE, B8 LTE CA, including MIMO/diversity reception. In the case of MIMO reception at least two antennas may be used. It may be advantageous to use a minimal set of antennas, especially at lower frequency ranges due to typically large volumes occupied by antennas. For example, different communications systems may share a common antenna and use common filtering. The terminal may have a filtering arrangement as illustrated in FIG. 13 connected to a main antenna interface and second filtering arrangement as illustrated in FIG. 14 connected to a second antenna interface. This second antenna interface may be used for MIMO reception and for communication with a second communication system at the same time as a first. For example duplexer 80 TX filter may be used for GSM800 transmission and duplexer 50 RX filter to aggregate GSM800 reception and B8 MIMO/ diversity reception to the same reception chain.

As will be appreciated from the foregoing, in embodiments, there is provided a reconfigurable radio frequency circuit for receiving at least one carrier in a wireless communications terminal, the wireless communications terminal being arranged to receive at least two carriers, each of the two carriers being transmitted in a different one of a plurality of operating frequency bands, each of the plurality of operating frequency bands occupying a part of a first or a second frequency range, the second frequency range being different from the first frequency range, the circuit including:

a plurality of receiver filters, including at least a first receiver filter arranged to pass carrier frequencies within a first operating frequency band within the first frequency range, a second receiver filter arranged pass second carrier frequencies within a second operating frequency band within the second frequency range, a third receiver filter arranged to pass carrier frequencies within a third operating frequency band, and a fourth receiver filter arranged to pass carrier frequencies within a fourth operating frequency band;

a first combiner for connecting the output of the first receiver filter at the first operating frequency band to a signal path leading to the input of a first amplifier and for connecting the output of the second receiver filter at the second operating frequency band to a signal path leading to the input of the first amplifier; and a second combiner for connecting the output of the third receiver filter at the third operating frequency band to a signal path leading to the input of a second amplifier and for connecting the output of the fourth receiver filter at the fourth operating frequency band to a signal path leading to the input of the second amplifier, wherein the first amplifier has an operating frequency range that is selectable at least between the first frequency range and the second frequency range, and the second amplifier has an operating frequency range that is selectable at least between the first frequency range and the second frequency range, and wherein at least two of said first, second, third and fourth receiver filters are arranged to pass frequency operating bands that may be used together and are arranged to be connected to a different one of said first and second amplifiers.

The at least two carriers may be component carriers transmitted using different SIM (Subscriber Identity Module) or USIM (Universal Subscriber Identity Module) data. In such cases, simultaneous reception of signals relating to both SIM/ USIMs is enabled.

The at least two carriers may be carriers received from different base stations for use in handover, wherein a carrier in the first frequency range may not be involved in a handover to a carrier in the second frequency range. In such cases, by arranging the first and second frequency ranges to be frequency ranges between which carriers are not handed over, the number of amplifiers required in the receiver can be reduced while still being able to perform handovers between base stations.

In some arrangements, only one of the first and second operating bands is allocated in an operating territory, thereby ensuring that their simultaneous usage will not be required. In further arrangements, the first operating frequency band may be arranged to receive cellular communications signals and the second operating frequency band may not be arranged to receive cellular communication signals in an operating territory, thereby ensuring that their simultaneous usage will not be required for cellular communications.

The second operating frequency band may be arranged to receive satellite navigation signals. The second operating frequency band may be arranged to receive signals of a wireless access system different from the cellular communications signals. The second operating frequency band may be arranged to receive network measurement signals and/or network based positioning measurement signals when the first operating frequency band is not used for reception. Hence, simultaneous reception of signals from multiple radio systems can be enabled.

The combiner may include one or more sections of strip-line having a length and impedance which are calculated on the basis of magnitudes and phases of reflection coefficients of the first and second receiver filters characterised at a given frequency. Hence, signals may be connected to the coupling arrangement at relatively low loss to a respective filter within the pass band of the filter, but to provide isolation to a filter at the pass band of the other filter to which the coupling arrangement is connected. The combiner may include a radio frequency switch.

In some arrangements, the first receiver filter is the receive part of a filter having both transmit and receive parts. For example a duplex filter. In further arrangements, at least the first receiver filter may be a Time Division Duplex (TDD) receiver filter, a Frequency Division Duplex (FDD) receiver filter, a receive part of a duplex filter, or the receive part of a triplex filter.

One or more of the first, second, third and fourth frequency ranges may be selected from selected from:
 a low band nominally 700-900 MHz;
 a mid band nominally 1400-1600 MHz;
 a band encompassing 1650 MHz;
 a high band nominally 1700-2200 MHz;
 a very high band nominally 2300-2700 MHz; and
 an ultra high band 3400-3800 MHz.

In other embodiments of the invention, there is provided a method of receiving at least one carrier in a wireless communications terminal, the wireless communications terminal being arranged to receive at least two carriers, each of said two carriers being transmitted in a different one of a plurality of operating frequency bands, each of the plurality of operating frequency bands occupying a part of a first or a second frequency range, the second frequency range being different from the first frequency range, the method including:
 filtering received signals including the at least one carrier using a plurality of receiver filters, including at least a first receiver filter, a second receiver filter, a third receiver filter and a fourth receiver filter, wherein the first receiver filter is arranged to pass signals in a first operating band within the first frequency range, the second receiver filter is arranged to pass signals in a second operating band within the second frequency range, the third receiver filter is arranged to pass signals within a third operating frequency band, and the fourth receiver filter is arranged to pass signals within a fourth operating frequency band;
 connecting the output of the first receiver filter to a signal path leading to the input of a first tuneable amplifier, connecting the output of the second receiver filter to a signal path leading to the input of the first tuneable amplifier, connecting the output of the third receiver filter to a signal path leading to the input of a second tuneable amplifier and connecting the output of the fourth receiver filter to a signal path leading to the input of the second tuneable amplifier; and
 selecting the operating frequency range of the first tuneable amplifier to include the operating frequency band of the at least one carrier, the operating frequency range of the first tuneable amplifier being selectable between at least the first and the second frequency range and the operating frequency range of the second tuneable amplifier between at least the first and second frequency range,
 wherein at least two of said first, second, third and fourth receiver filters are arranged to pass frequency operating bands that may be used together and are arranged to be connected to a different one of said first and second amplifiers.

The at least two carriers may be component carriers transmitted using different SIM (Subscriber Identity Module) or USIM (Universal Subscriber Identity Module) data. In such cases, simultaneous reception of signals relating to both SIM/USIMs is enabled.

The at least two carriers may be carriers received from different base stations for use in handover, wherein a carrier in the first frequency range may not be involved in a handover to a carrier in the second frequency range. In such cases, by arranging the first and second frequency ranges to be frequency ranges between which carriers are not handed over, the number of amplifiers required in the receiver can be reduced while still being able to perform handovers between base stations.

In some arrangements, only one of the first and second operating bands is allocated in an operating territory, thereby ensuring that their simultaneous usage will not be required. In further arrangements, the first operating frequency band may be arranged to receive cellular communications signals and the second operating frequency band may not be arranged to receive cellular communication signals in an operating territory, thereby ensuring that their simultaneous usage will not be required for cellular communications.

The second operating frequency band may be arranged to receive satellite navigation signals. The second operating frequency band may be arranged to receive signals of a wireless access system different from the cellular communications signals. The second operating frequency band may be arranged to receive network measurement signals and/or network based positioning measurement signals when the first operating frequency band is not used for reception. Hence, simultaneous reception of signals from multiple radio systems can be enabled.

The connecting may include connecting by means of one or more sections of strip-line having a length and impedance which are calculated on the basis of magnitudes and phases of reflection coefficients of the first and second receiver filters characterised at a given frequency. Hence, signals may be connected to the coupling arrangement at relatively low loss to a respective filter within the pass band of the filter, but to provide isolation to a filter at the pass band of the other filter to which the coupling arrangement is connected. The connecting may include a radio frequency switch.

In some arrangements, the first receiver filter is the receive part of a filter having both transmit and receive parts. For example a duplex filter. In further arrangements, at least the first receiver filter may be a Time Division Duplex (TDD) receiver filter, a Frequency Division Duplex (FDD) receiver filter, a receive part of a duplex filter, or the receive part of a triplex filter.

One or more of the first, second, third and fourth frequency ranges may be selected from selected from:
 a low band nominally 700-900 MHz;
 a mid band nominally 1400-1600 MHz;
 a band encompassing 1650 MHz;
 a high band nominally 1700-2200 MHz;
 a very high band nominally 2300-2700 MHz; and
 an ultra high band 3400-3800 MHz.

In embodiments of the invention, one or more of the tuneable amplifiers, radio frequency switches, antenna switch and programmable dividers may be controlled by a processor or processing system.

It will be understood that the processor or processing system or circuitry referred to herein may in practice be provided by a single chip or integrated circuit or plural chips or integrated circuits, integrated on module, optionally provided as a chipset, an application-specific integrated circuit (ASIC), field-programmable gate array (FPGA), etc. The chip or chips may include circuitry (as well as possibly firmware) for embodying at least one or more of a data processor or processors, a modem processor or processors, a digital signal processor or processors, baseband circuitry and radio frequency circuitry, which are configurable and controllable with controls so as to operate in accordance with the exemplary embodiments. In this regard, the exemplary embodiments may be implemented at least in part by computer software stored in (non-transitory) memory and executable by the processor, or by hardware, or by a combination of tangibly stored software and hardware (and tangibly stored firmware).

The above embodiments are to be understood as illustrative examples of the invention. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A reconfigurable radio frequency circuit for receiving at least one carrier in a wireless communications terminal, the wireless communications terminal being arranged to receive at least two carriers, each of the two carriers being transmitted in a different one of a plurality of operating frequency bands, each of the plurality of operating frequency bands occupying a part of a first or a second frequency range, the second frequency range being different from the first frequency range, the circuit comprising:
 a plurality of receiver filters, including at least a first receiver filter arranged to pass carrier frequencies within a first operating frequency band within the first frequency range, a second receiver filter arranged pass second carrier frequencies within a second operating frequency band within the second frequency range, a third receiver filter arranged to pass carrier frequencies within a third operating frequency band, and a fourth receiver filter arranged to pass carrier frequencies within a fourth operating frequency band;
 a first combiner for connecting the output of the first receiver filter at the first operating frequency band to a signal path leading to the input of a first amplifier and for connecting the output of the second receiver filter at the second operating frequency band to a signal path leading to the input of the first amplifier; and
 a second combiner for connecting the output of the third receiver filter at the third operating frequency band to a signal path leading to the input of a second amplifier and for connecting the output of the fourth receiver filter at the fourth operating frequency band to a signal path leading to the input of the second amplifier,
 wherein the first amplifier has an operating frequency range that is selectable at least between the first frequency range and the second frequency range, and the second amplifier has an operating frequency range that is selectable at least between the first frequency range and the second frequency range, and
 wherein at least two of said first, second, third and fourth receiver filters are arranged to pass frequency operating bands that may be used together and are arranged to be connected to a different one of said first and second amplifiers.

2. The circuit according to claim 1, wherein at least one of said first amplifier and said second amplifier comprises a resonator coil with one or more selectable tapping point.

3. The circuit according to claim 1, wherein at least one of said first amplifier and said second amplifier is a low noise amplifier (LNA).

4. The circuit according to claim 3, wherein at least one of said first tuneable amplifier and said second tuneable amplifier is arranged to have a lower Noise Figure (NF) within the first frequency range than a Noise Figure (NF) within the second frequency range when the first frequency range is selected, and a lower Noise Figure (NF) within the second frequency range than a Noise Figure (NF) within the first frequency range when the second frequency range is operational.

5. The circuit according to claim 1, wherein the second operating frequency band is arranged to be an operating frequency band not required for use in receiving any of said at least two carriers at the same time as the first operating frequency band is required for use in receiving at least one of said at least two carriers.

6. The circuit according to claim 1, wherein said at least two carriers are component carriers transmitted using carrier aggregation according to a carrier aggregation scheme in which a first carrier in said first operating frequency band may not be aggregated with a second carrier within said second operating frequency band.

7. The circuit according to claim 1, wherein said first operating frequency band is arranged to receive cellular communications signals and said second operating frequency band is not arranged to receive cellular communication signals in an operating territory.

8. The circuit according to claim 1, wherein the first receiver filter is a filter having a tuneable frequency response arranged such that the first operating frequency band is tuneable to have a frequency response within the first frequency range.

9. The circuit according to claim 1, wherein the second receiver filter is a tuneable filter arranged such that the second operating frequency band is tuneable within the second frequency range.

10. The circuit according to claim 1, the circuit being configurable to a first mode for use when said at least two carriers are within a first frequency range, the circuit comprising:

a first radio frequency switch for connecting received carriers to a first receiver chain for passing carrier frequencies within the first frequency range in the first mode, the first receiver chain comprising an amplifier arranged to operate in the first frequency range; and a second radio frequency switch for connecting received carriers to a second receiver chain for passing carrier frequencies within the first frequency range in the first mode, the second receiver chain comprising a tuneable amplifier having a selectable operating frequency range, the operating frequency range being selectable between the first and second frequency range;

wherein the operating range of the tuneable amplifier is arranged to be set to the first frequency range in the first mode.

11. A method of receiving at least one carrier in a wireless communications terminal, the wireless communications terminal being arranged to receive at least two carriers, each of said two carriers being transmitted in a different one of a plurality of operating frequency bands, each of the plurality of operating frequency bands occupying a part of a first or a second frequency range, the second frequency range being different from the first frequency range, the method comprising:

filtering received signals comprising the at least one carrier using a plurality of receiver filters, including at least a first receiver filter, a second receiver filter, a third receiver filter and a fourth receiver filter, wherein the first receiver filter is arranged to pass signals in a first operating band within the first frequency range, the second receiver filter is arranged to pass signals in a second operating band within the second frequency range, the third receiver filter is arranged to pass signals within a third operating frequency band, and the fourth receiver filter is arranged to pass signals within a fourth operating frequency band;

connecting the output of the first receiver filter to a signal path leading to the input of a first tuneable amplifier, connecting the output of the second receiver filter to a signal path leading to the input of the first tuneable amplifier, connecting the output of the third receiver filter to a signal path leading to the input of a second tuneable amplifier and connecting the output of the fourth receiver filter to a signal path leading to the input of the second tuneable amplifier; and selecting the operating frequency range of the first tuneable amplifier to include the operating frequency band of the at least one carrier, the operating frequency range of the first tuneable amplifier being selectable between at least the first and the second frequency range and the operating frequency range of the second tuneable amplifier between at least the first and second frequency range, wherein at least two of said first, second, third and fourth receiver filters are arranged to pass frequency operating bands that may be used together and are arranged to be connected to a different one of said first and second amplifiers.

12. The method according to claim 11, wherein said selecting the operating frequency range of at least one of said first tuneable amplifier and said second tuneable amplifier comprises selecting one or more tapping point of a resonator coil.

13. The method according to claim 11, wherein at least one of said first tuneable amplifier and said second tuneable amplifier is a low noise amplifier (LNA).

14. The method according to claim 13, the method comprising arranging for at least one of said first tuneable amplifier and said second tuneable amplifier to have a lower Noise Figure (NF) within the first frequency range than a Noise Figure (NF) within the second frequency range when the first frequency range is selected, and a lower Noise Figure (NF) within the second frequency range than a Noise Figure (NF) within the first frequency range when the second frequency range is selected.

15. The method according to claim 11, wherein the second operating frequency band is arranged to be an operating frequency band not required for use in receiving any of said at least two carriers at the same time as the first operating frequency band is required for use in receiving at least one of said at least two carriers.

16. The method according to claim 11, wherein said at least two carriers are component carriers transmitted using carrier aggregation, wherein a carrier in the first frequency range may not be involved in a handover to a carrier in the second frequency range.

17. The method according to claim 11, wherein said first operating frequency band is arranged to receive cellular communications signals and said second operating frequency band is not arranged to receive cellular communication signals.

18. The method according to claim 11, wherein the first receiver filter is a tuneable filter arranged such that the first operating frequency band is tuneable within the first frequency range.

19. The method according to claim 11, wherein the second receiver filter is a tuneable filter arranged such that the second operating frequency band is tuneable within the second frequency range.

20. The method according to claim 11, the wireless communication terminal being configurable to a first mode for use when said at least two carriers are within a first frequency range, the method comprising:

connecting, using a first radio frequency switch, received carriers to a first receiver chain for passing carrier frequencies within the first frequency range in the first mode, the first receiver chain comprising an amplifier arranged to operate in the first frequency range;

connecting, using a second radio frequency switch, received carriers to a second receiver chain for passing carrier frequencies within the first frequency range in the first mode, the second receiver chain comprising a tuneable amplifier having a selectable operating frequency range, the operating frequency range being selectable between the first and second frequency range; and setting the operating range of the tuneable amplifier to the first frequency range in the first mode.

* * * * *